US012192742B2

(12) United States Patent
Murata et al.

(10) Patent No.: US 12,192,742 B2
(45) Date of Patent: Jan. 7, 2025

(54) FILTER GENERATION DEVICE AND FILTER GENERATION METHOD

(71) Applicant: JVCKENWOOD Corporation, Yokohama (JP)

(72) Inventors: Hisako Murata, Yokohama (JP); Takahiro Gejo, Yokohama (JP); Yumi Fujii, Yokohama (JP); Masaya Konishi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 212 days.

(21) Appl. No.: 17/939,883

(22) Filed: Sep. 7, 2022

(65) Prior Publication Data

US 2023/0114777 A1 Apr. 13, 2023

(30) Foreign Application Priority Data

Sep. 27, 2021 (JP) ................................ 2021-156783
Sep. 27, 2021 (JP) ................................ 2021-156784

(51) Int. Cl.

| | |
|---|---|
| ***H04S 7/00*** | (2006.01) |
| ***H04R 1/26*** | (2006.01) |
| ***H04R 3/04*** | (2006.01) |
| ***H04R 5/027*** | (2006.01) |
| ***H04R 5/033*** | (2006.01) |
| ***H04R 5/04*** | (2006.01) |
| ***H04S 1/00*** | (2006.01) |

(52) U.S. Cl.
CPC ............. *H04S 7/307* (2013.01); *H04R 1/265* (2013.01); *H04R 3/04* (2013.01); *H04R 5/027* (2013.01); *H04R 5/033* (2013.01); *H04R 5/04* (2013.01); *H04S 1/007* (2013.01); *H04S 2400/11* (2013.01); *H04S 2400/15* (2013.01)

(58) Field of Classification Search
CPC ...... H04S 7/307; H04S 1/007; H04S 2400/11; H04S 2400/15; H04R 1/265; H04R 3/04; H04R 5/027; H04R 5/033; H04R 5/04
USPC ........................................ 381/303, 106, 94.8
See application file for complete search history.

(56) References Cited

U.S. PATENT DOCUMENTS

2010/0142727 A1* 6/2010 Otani ..................... H03G 9/005
381/98
2020/0213802 A1* 7/2020 Takachi ................... H04R 3/04

FOREIGN PATENT DOCUMENTS

JP 2019062430 A 4/2019

* cited by examiner

*Primary Examiner* — Vivian C Chin
*Assistant Examiner* — Douglas J Suthers
(74) *Attorney, Agent, or Firm* — Procopio, Cory, Hargreaves & Savitch LLP

(57) ABSTRACT

An object of the present disclosure is to provide a filter generation device and a filter generation method, capable of generating a filter suitable for out-of-head localization processing. A processing device according to an embodiment includes: a frequency characteristics acquisition unit configured to acquire frequency characteristics based on sound pickup signals; a level calculation unit configured to calculate a reference level in the frequency characteristics; a correction unit configured to correct the frequency characteristics so that the frequency characteristics fall within a predetermined level range including the reference level, and thereby calculate corrected characteristics; and a filter generation unit configured to generate a corrected filter based on the corrected characteristics.

8 Claims, 12 Drawing Sheets

FILTER GENERATION DEVICE AND FILTER GENERATION METHOD

CROSS REFERENCE TO RELATED APPLICATION

This application is based upon and claims the benefit of priority from Japanese patent application No. 2021-156783, filed on Sep. 27, 2021 and Japanese patent application No. 2021-156784, filed on Sep. 27, 2021, the disclosure of which is incorporated herein in its entirety by reference.

BACKGROUND

The present disclosure relates to a filter generation device and a filter generation method.

Sound localization techniques include an out-of-head localization technique, which localizes sound images outside the head of a listener by using headphones. The out-of-head localization technique works to cancels characteristics from headphones to the ears (headphone characteristics), and gives two characteristics from one speaker (monaural speaker) to the ears (spatial acoustic transfer characteristics). This localizes the sound images outside the head.

In out-of-head localization reproduction with a stereo speaker, measurement signals (impulse sounds etc.) that are output from 2-channel (which is referred to hereinafter as "ch") speakers are recorded by microphones (which can be also called "mike") placed on the listener's ears. Then, the processing device generates a filter based on sound pickup signals obtained by picking up the measurement signal. The generated filter is convolved to 2ch audio signals, thereby implementing out-of-head localization reproduction.

In addition, to generate a filter to cancel headphone-to-ear characteristics, which is called an inverse filter, characteristics from the headphones to a vicinity of the ear or the eardrum (also referred to as ear canal transfer function ECTF, or ear canal transfer characteristics) are measured with a microphone placed in the listener's ear.

Japanese Unexamined Patent Application Publication No. 2019-62430 discloses a device for performing out-of-head localization processing. Further, in Japanese Unexamined Patent Application Publication No. 2019-62430, the out-of-head localization processing performs DRC (Dynamic Range Compression) processing on reproduced signals. In the DRC processing, a processing device smooths frequency characteristics. Further, the processing device divides a band based on the smoothed characteristics.

SUMMARY

In such out-of-head localization listening, it is desirable to perform processing without being limited to a specific playback device. For example, it is desired to appropriately perform the out-of-head localization processing if headphones owned by the user are used as the playback device. Alternatively, it is desired to reproduce the spatial acoustic transfer characteristics in an environment in which the speaker normally used by the user is placed as a playback device.

If the playback device is changed, the transfer characteristics may change. Therefore, it is preferable to measure the user's individual characteristics (spatial acoustic transfer characteristics and ear canal transfer characteristics) using the playback device used by the user. Even if individual characteristics are measured, steep peaks and dips may occur in the frequency characteristics, clipping the signals subjected to out-of-head localization processing.

Peaks and dips change depending on the characteristics of playback device such as speakers and headphones, or the acoustic characteristics of the room that is the measurement environment. The peak and dip also change depending on the shapes of the head and ears of the individual user. Thus, the peak and dip levels and frequencies vary depending on various causes. Some playback device and measurement environment require to check the characteristics and make adjustments according to the playback device and measurement environment.

A filter generation device according to an embodiment includes: a frequency characteristics acquisition unit configured to acquire frequency characteristics based on sound pickup signals; a level calculation unit configured to calculate a reference level in the frequency characteristics; a correction unit configured to correct the frequency characteristics so that the frequency characteristics fall within a predetermined level range including the reference level, and thereby calculate corrected characteristics; and a filter generation unit configured to generate a corrected filter based on the corrected characteristics.

A filter generation method according to this embodiment includes: a step of acquiring frequency characteristics based on sound pickup signals; a step of calculating a reference level in the frequency characteristics; a step of correcting the frequency characteristics so that the frequency characteristics fall within a predetermined level range including the reference level, and thereby calculating corrected characteristics; and a step of generating a filter based on the corrected characteristics.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

The overview of a sound localization processing according to an embodiment is described hereinafter. An out-of-head localization processing according to this embodiment performs out-of-head localization processing by using spatial acoustic transfer characteristics and ear canal transfer characteristics. The spatial acoustic transfer characteristics are transfer characteristics from a sound source such as speakers to the ear canal. The ear canal transfer characteristics is transfer characteristics from the speaker unit of headphones or earphones to the eardrum. In this embodiment, the spatial acoustic transfer characteristics are measured without headphones or earphones being worn, and the ear canal transfer characteristics are measured with headphones or earphones being worn, so that out-of-head localization processing is implemented using these measurement data. This embodiment is characterized by a microphone system for measuring spatial acoustic transfer characteristics or ear canal transfer characteristics.

The out-of-head localization processing according to this embodiment is executed on a user terminal such as a personal computer, a smart phone, or a tablet PC. The user terminal is an information processing device including processing means such as a processor, storage means such as a memory or a hard disk, display means such as a liquid crystal monitor, and input means such as a touch panel, a button, a keyboard and a mouse. The user terminal may have a communication function for transmitting and receiving data. Further, the user terminal is connected to output means (output unit) with headphones or earphones.

The connection between the user terminal and the output means may be a wired connection or a wireless connection.

First Embodiment (Out-Of-Head Localization Processing Device)

Figure 1:
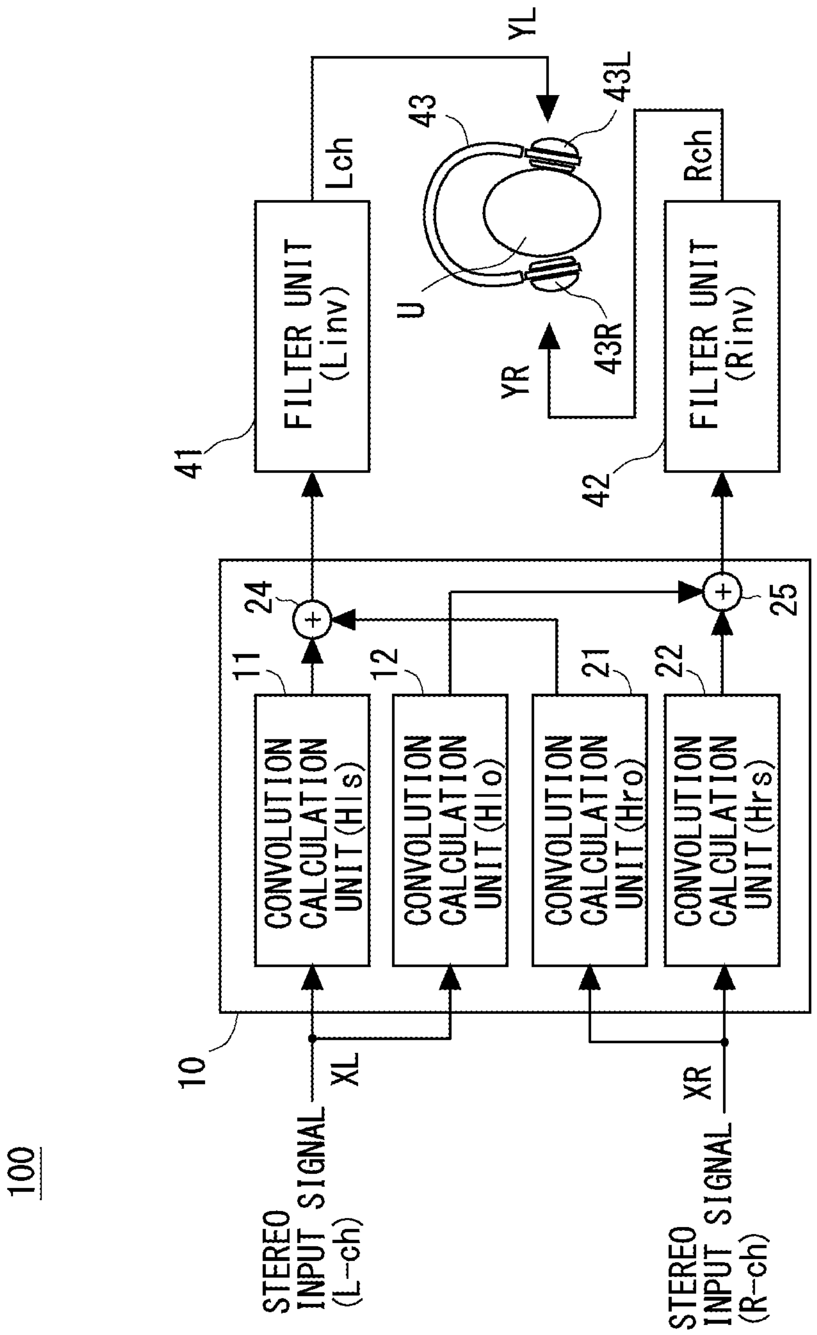
FIG. 1 is a block diagram showing an out-of-head localization processing device according to an embodiment.

FIG. 1 shows a block diagram of an out-of-head localization processing device 100, which is an example of a sound field reproducing device according to this embodiment. The out-of-head localization processing device 100 reproduces a sound field for the user U who wears the headphones 43. Thus, the out-of-head localization processing device 100 performs sound localization processing for L-ch and R-ch stereo input signals XL and XR. The L-ch and R-ch stereo input signals XL and XR are analog audio reproduced signals that are output from a CD (Compact Disc) player or the like or digital audio data such as mp3 (MPEG Audio Layer-3). Note that the audio reproduced signals or digital audio data are collectively referred to as a reproduced signal. In other words, the stereo input signals XL and XR of L-ch and R-ch are reproduced signals.

Note that the out-of-head localization processing device 100 is not limited to a physically single device, and a part of processing may be performed in a different device. For example, a part of processing may be performed by a smart phone or the like, and the remaining processing may be performed by a DSP (Digital Signal Processor) built in the headphones 43 or the like.

The out-of-head localization processing device 100 includes an out-of-head localization unit 10, a filter unit 41 for storing an inverse filter Linv, a filter unit 42 for storing an inverse filter Rinv, and headphones 43. The out-of-head localization unit 10, the filter unit 41, and the filter unit 42 can be specifically implemented by a processor or the like.

The out-of-head localization unit 10 includes convolution calculation units 11 to 12 and 21 to 22 for storing the spatial acoustic transfer characteristics His, Hlo, Hro, and Hrs, and adders 24, 25. The convolution calculation units 11 to 12 and 21 to 22 perform convolution processing using the spatial acoustic transfer characteristics. The stereo input signals XL and XR from a CD player or the like are input to the out-of-head localization unit 10. The spatial acoustic transfer characteristics are set to the out-of-head localization unit 10. The out-of-head localization unit 10 convolves a filter of the spatial acoustic transfer characteristics (which is hereinafter referred to also as a spatial acoustic filter) into each of the stereo input signals XL and XR of L-ch and R-ch. The spatial acoustic transfer characteristics may be a head-related transfer function HRTF measured in the head or auricle of a person being measured, or may be the head-related transfer function of a dummy head or a third person.

The spatial acoustic transfer function is a set of four spatial acoustic transfer characteristics Hls, Hlo, Hro and Hrs. Data used for convolution in the convolution calculation units 11 to 12 and 21 to 22 is a spatial acoustic filter. The spatial acoustic filter is generated by cutting out the spatial acoustic transfer characteristics Hls, Hlo, Hro and Hrs with a predetermined filter length.

Each of the spatial acoustic transfer characteristics Hls, Hlo, Hro and Hrs is acquired in advance by impulse response measurement or the like. For example, the user U wears microphones on the left and right ears, respectively. Left and right speakers placed in front of the user U output impulse sounds for performing impulse response measurements. Then, the measurement signals such as the impulse sounds output from the speakers are picked up by the microphones. The spatial acoustic transfer characteristics Hls, Hlo, Hro and Hrs are acquired based on sound pickup signals in the microphones. The spatial acoustic transfer characteristics Hls between the left speaker and the left microphone, the spatial acoustic transfer characteristics Hlo between the left speaker and the right microphone, the spatial acoustic transfer characteristics Hro between the right speaker and the left microphone, and the spatial acoustic transfer characteristics Hrs between the right speaker and the right microphone are measured.

The convolution calculation unit 11 convolves the spatial acoustic filter in accordance with the spatial acoustic transfer characteristics Hls to the L-ch stereo input signal XL. The convolution calculation unit 11 outputs convolution calculation data to the adder 24. The convolution calculation unit 21 convolves the spatial acoustic filter in accordance with the spatial acoustic transfer characteristics Hro to the R-ch stereo input signal XR. The convolution calculation unit 21 outputs convolution calculation data to the adder 24. The adder 24 adds the two convolution calculation data and outputs the data to the filter unit 41.

The convolution calculation unit 12 convolves the spatial acoustic filter in accordance with the spatial acoustic transfer characteristics Hlo to the L-ch stereo input signal XL. The convolution calculation unit 12 outputs the convolution calculation data to the adder 25. The convolution calculation unit 22 convolves the spatial acoustic filter in accordance with the spatial acoustic transfer characteristics Hrs to the R-ch stereo input signal XR. The convolution calculation unit 22 outputs convolution calculation data to the adder 25. The adder 25 adds the two convolution calculation data and outputs the data to the filter unit 42.

Inverse filters Linv and Rinv for canceling the headphone characteristics (characteristics between the headphone reproduction units and the microphones) are set in the filter units 41 and 42. Then, the inverse filters Linv and Rinv are convolved into the reproduced signals (convolution calculation signals) subjected to processing in the out-of-head localization unit 10. The filter unit 41 convolves the inverse filter Linv of the L-ch headphone characteristics to the L-ch signal from the adder 24. Likewise, the filter unit 42 convolves the inverse filter Rinv of the R-ch headphone characteristics to the R-ch signal from the adder 25. The inverse filters Linv and Rinv cancel out the characteristics from the headphone units to the microphones when the headphones 43 are worn. The microphones may be placed at any position between the entrance of the ear canal and the eardrum.

The filter unit 41 outputs the processed L-ch signal YL to the left unit 43L of the headphones 43. The filter unit 42 outputs the processed R-ch signal YR to the right unit 43R of the headphones 43. The user U wears the headphones 43. The headphones 43 output the L-ch signal YL and the R-ch signal YR (hereinafter, the L-ch signal YL and the R-ch signal YR are collectively referred to as a stereo signal) toward the user U. This can reproduce sound images localized outside the head of the user U.

As described above, the out-of-head localization processing device 100 performs out-of-head localization processing using the spatial acoustic filters in accordance with the spatial acoustic transfer characteristics Hls, Hlo, Hro, and Hrs, and the inverse filters Liny and Rinv of the headphone characteristics. In the following description, the spatial acoustic filters in accordance with the spatial acoustic transfer characteristics Hls, Hlo, Hro, and Hrs, and the inverse filters Linv and Rinv of the headphone characteristics are collectively referred to as an out-of-head localization processing filter. In the case of 2ch stereo reproduced signals, the out-of-head localization filter is composed of four spatial acoustic filters and two inverse filters. The out-of-head localization processing device 100 then carries out convolution calculation processing on the stereo reproduced signals by using the out-of-head localization filter composed of totally six filters and thereby performs out-of-head localization processing. The out-of-head localization filter is preferably based on the measurement of the individual user U. For example, the out-of-head localization filter is set based on sound pickup signals picked up by the microphones worn on the ears of the user U.

In this way, the spatial acoustic filters and the inverse filters Linv and Rinv for headphone characteristics are filters for audio signals. These filters are convolved into the reproduced signals (stereo input signals XL and XR), and thereby the out-of-head localization processing device 100 executes the out-of-head localization processing. In this embodiment, one of the technical features is processing of generating the spatial acoustic filter. Specifically, in the processing of generating the spatial acoustic filter, a level range compression of frequency characteristics is performed.

(Measurement Device of Spatial Acoustic Transfer Characteristics)

Figure 2:
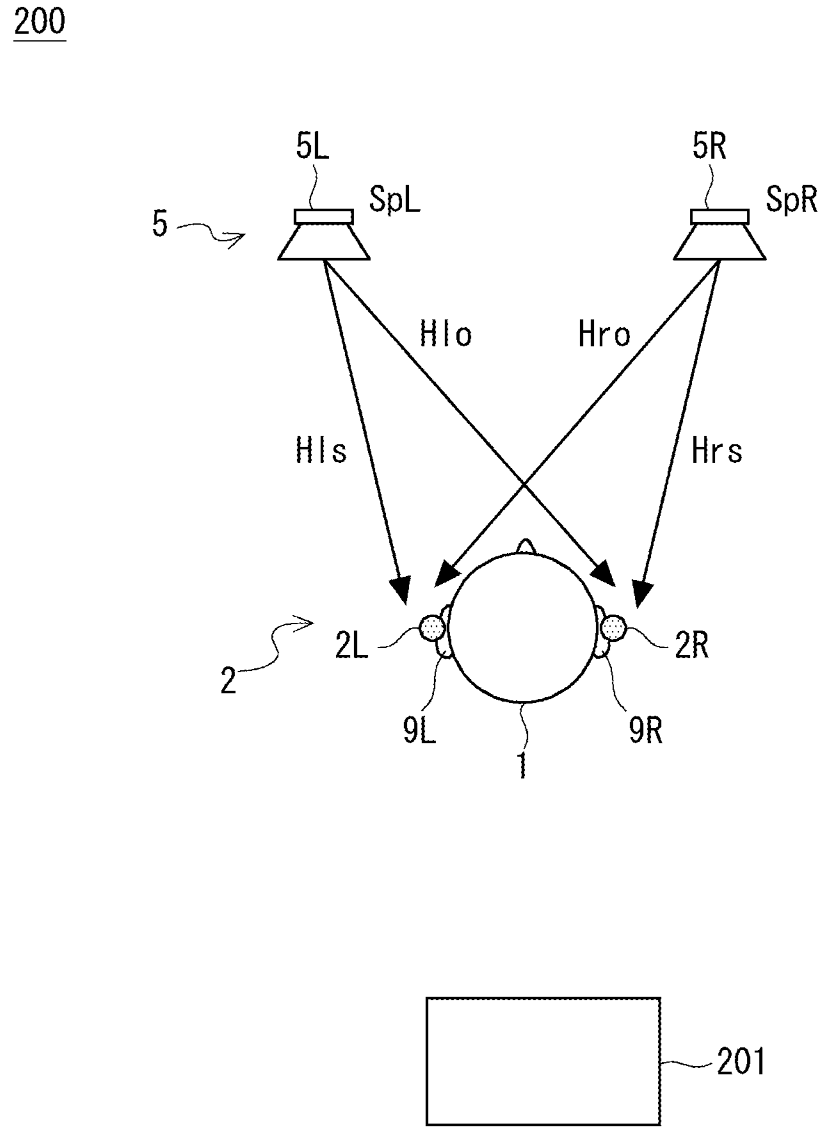
FIG. 2 is a diagram schematically showing a configuration of a measurement device for measuring spatial acoustic transfer characteristics.

A measurement device 200 for measuring the spatial acoustic transfer characteristics Hls, Hlo, Hro, and Hrs is described hereinafter with reference to FIG. 2. FIG. 2 is a diagram schematically showing a measurement configuration for performing measurement on a person 1 being measured. Note that the person 1 being measured here is the same person as the user U in FIG. 1, but may be a different person.

As shown in FIG. 2, the measurement device 200 includes a stereo speaker 5 and a microphone unit 2. The stereo speaker 5 is placed in a measurement environment. The measurement environment may be the user U's room at home, a dealer or showroom of an audio system or the like. The measurement environment is preferably a listening room where speakers and acoustics are in good condition.

In this embodiment, a processing device 201 of the measurement device 200 performs arithmetic processing for appropriately generating the spatial acoustic filter. The processing device 201 includes a music player such as a CD player, for example. The processing device 201 may be a personal computer (PC), a tablet terminal, a smart phone or the like. Further, the processing device 201 may be a server device.

The stereo speaker 5 includes a left speaker 5L and a right speaker 5R. For example, the left speaker 5L and the right speaker 5R are placed in front of the person 1 being measured. The left speaker 5L and the right speaker 5R output impulse sounds or the like for impulse response measurement. Although the number of speakers, which serve as sound sources, is 2 (stereo speakers) in this embodiment in the following description, the number of sound sources to be used for measurement is not limited to 2, and it may be 1 or more. In other words, this embodiment can be applied to 1ch monaural, or what is called a multi-channel environment such as 5.1ch or 7.1ch in the same manner.

The microphone unit 2 is stereo microphones including a left microphone 2L and a right microphone 2R. The left microphone 2L is placed on a left ear 9L of the person 1 being measured, and the right microphone 2R is placed on a right ear 9R of the person 1 being measured. To be specific, the microphones 2L and 2R are preferably placed at a position between the entrance of the ear canal and the eardrum of the left ear 9L and the right ear 9R, respectively. The microphones 2L and 2R pick up measurement signals output from the stereo speaker 5 and acquire sound pickup signals. The microphones 2L and 2R output the sound pickup signals to the processing device 201. The person 1 being measured may be a person or a dummy head. In other words, in this embodiment, the person 1 being measured is a concept that includes not only a person but also a dummy head.

As described above, impulse sounds output from the left speaker 5L and right speaker 5R are measured using the microphones 2L and 2R, respectively, and thereby impulse response is measured. The processing device 201 stores the sound pickup signals acquired by the impulse response measurement into a memory or the like. The spatial acoustic transfer characteristics Hls between the left speaker 5L and the left microphone 2L, the spatial acoustic transfer characteristics Hlo between the left speaker 5L and the right microphone 2R, the spatial acoustic transfer characteristics Hro between the right speaker 5R and the left microphone 2L, and the spatial acoustic transfer characteristics Hrs between the right speaker 5R and the right microphone 2R are thereby measured. Specifically, the left microphone 2L picks up the measurement signal that is output from the left speaker 5L, and thereby the spatial acoustic transfer characteristics Hls are acquired. The right microphone 2R picks up the measurement signal that is output from the left speaker 5L, and thereby the spatial acoustic transfer characteristics Hlo are acquired. The left microphone 2L picks up the measurement signal that is output from the right speaker 5R, and thereby the spatial acoustic transfer characteristics Hro are acquired. The right microphone 2R picks up the measurement signal that is output from the right speaker 5R, and thereby the spatial acoustic transfer characteristics Hrs are acquired.

Further, the measurement device 200 may generate the spatial acoustic filters in accordance with the spatial acoustic transfer characteristics Hls, Hlo, Hro and Hrs from the left and right speakers 5L and 5R to the left and right microphones 2L and 2R based on the sound pickup signals. For example, the processing device 201 cuts out the spatial acoustic transfer characteristics Hls, Hlo, Hro, and Hrs with a predetermined filter length. The processing device 201 may correct the measured spatial acoustic transfer characteristics Hls, Hlo, Hro, and Hrs.

In this manner, the processing device or 201 generates the spatial acoustic filter to be used for convolution calculation of the out-of-head localization processing device 100. As shown in FIG. 1, the out-of-head localization processing device 100 performs out-of-head localization processing by using the spatial acoustic filters in accordance with the spatial acoustic transfer characteristics Hls, Hlo, Hro, and Hrs between the left and right speakers 5L and 5R and the left and right microphones 2L and 2R. Specifically, the out-of-head localization processing is performed by convolving the spatial acoustic filters to the audio reproduced signals.

The processing device 201 performs the same processing on the sound pickup signals corresponding to each of the spatial acoustic transfer characteristics Hls, Hlo, Hro, and Hrs. Specifically, the same processing is performed on each of the four sound pickup signals corresponding to the spatial acoustic transfer characteristics Hls, Hlo, Hro, and Hrs. The spatial acoustic filters respectively corresponding to the spatial acoustic transfer characteristics Hls, Hlo, Hro and Hrs are thereby generated.

(Measurement Device of Ear Canal Transfer Characteristics)

Figure 3:
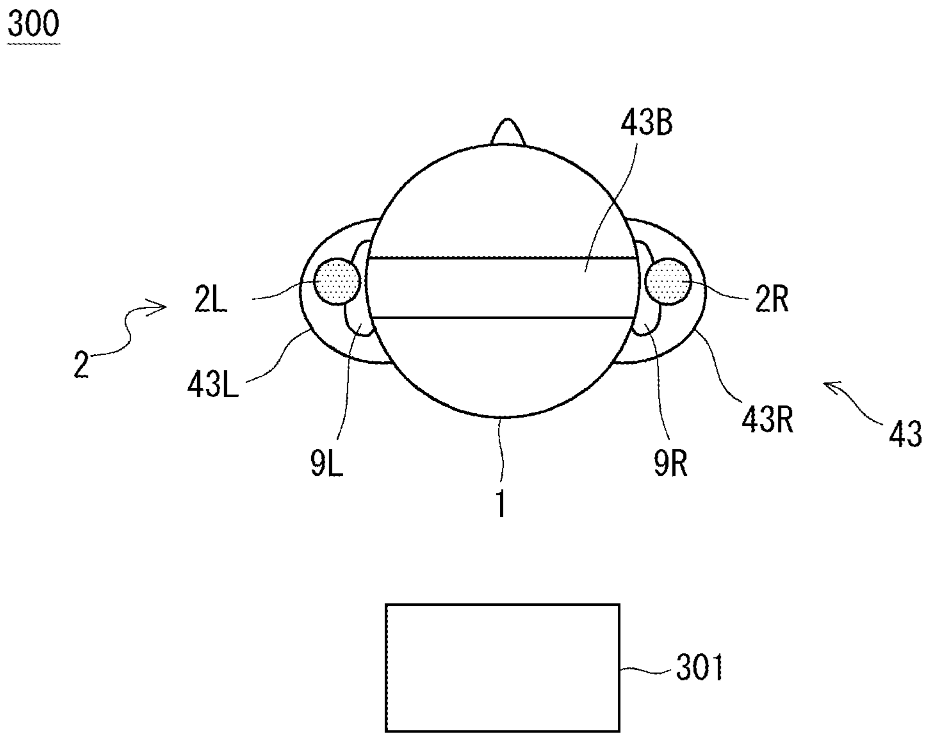
FIG. 3 is a diagram schematically showing a configuration of a measurement device for measuring ear canal transfer characteristics.

The measurement device 300 for ear canal transfer characteristics will be described with reference to FIG. 3. FIG. 3 shows a configuration for measuring transfer characteristics for the user U. The measurement device 300 measures the ear canal transfer characteristics to generate inverse filters. The measurement device 300 includes microphone unit 2, headphones 43, and a processing device 301. Note that the person 1 being measured here is the same person as the user U in FIG. 1, but may be a different person.

In this embodiment, the processing device 301 of the measurement device 300 performs arithmetic processing for appropriately generating the filters according to the measurement results. The processing device 301 is a personal computer (PC), a tablet terminal, a smart phone, or the like, and includes a memory and a processor. The memory stores processing programs, various parameters, measurement data, and the like. The processor executes a processing program stored in the memory. The processor executes the processing program and thereby each process is executed. The processor may be, for example, a CPU (Central Processing Unit), an FPGA (Field-Programmable Gate Array), a DSP (Digital Signal Processor), an ASIC (Application Specific Integrated Circuit), a GPU (Graphics Processing Unit), or the like.

Further, the processing device 301 of FIG. 3 may be a processing device that is physically the same as the processing device 201 of FIG. 2, or may be a different processing device therefrom. In other words, the measurements in FIGS. 2 and 3 are not limited to a configuration implemented using the same processing device. For example, the measurement shown in FIG. 2 may be performed by a processing device 201 dedicated to measurement placed in a listening room or the like, and the measurement shown in FIG. 3 may be performed by a general-purpose processing device 301 such as a smart phone.

The processing device 301 is connected to the microphone unit 2 and the headphones 43. Note that the microphone unit 2 may be built in the headphones 43. The microphone unit 2 includes a left microphone 2L and a right microphone 2R. The left microphone 2L is worn on a left ear 9L of the user U. The right microphone 2R is worn on a right ear 9R of the user U. The processing device 301 may be the same processing device as or a different processing device from the out-of-head localization processing device 100. Earphones may be used instead of the headphones 43.

The headphones 43 include a headphone band 43B, a left unit 43L, and a right unit 43R. The headphone band 43B connects the left unit 43L and the right unit 43R. The left unit 43L outputs a sound toward the left ear 9L of the user U. The right unit 43R outputs a sound toward the right ear 9R of the user U. The type of the headphones 43 may be closed, open, semi-open, semi-closed or any other type. The headphones 43 are worn on the user U while the microphone unit 2 is worn on the user U. Specifically, the left unit 43L of the headphones 43 is worn on the left ear 9L on which the left microphone 2L is worn; the right unit 43R of the headphones 43 is worn on the right ear 9R on which the right microphone 2R is worn. The headphone band 43B generates an urging force to press the left unit 43L and the right unit 43R against the left ear 9L and the right ear 9R, respectively.

The left microphone 2L picks up the sound output from the left unit 43L of the headphones 43. The right microphone 2R picks up the sound output from the right unit 43R of the headphones 43. Each of microphone parts of the left microphone 2L and the right microphone 2R is placed at a sound pickup position near the external acoustic openings. The left microphone 2L and the right microphone 2R are formed not to interfere with the headphones 43. Specifically, the user U can wear the headphones 43 in the state in which the left microphone 2L and the right microphone 2R are placed at appropriate positions of the left ear 9L and the right ear 9R, respectively.

The processing device 301 outputs measurement signals to the headphones 43. As a result, the headphones 43 generate an impulse sound or the like. To be specific, an impulse sound output from the left unit 43L is measured by the left microphone 2L. An impulse sound output from the right unit 43R is measured by the right microphone 2R. The microphones 2L and 2R acquire sound pickup signals at the time of outputting the measurement signals, and thereby impulse response measurement is performed.

The processing device 301 performs the same processing on the sound pickup signals from the microphones 2L and 2R, and thereby generates the inverse filters Linv and Rinv.

(Level Range Compression)

At least one of the measurement device 200 and the measurement device 300 performs processing to compress a range so that the frequency characteristics of the sound pickup signals fall within a predetermined level range. The following describes processing in which the measurement device 200 compresses the level range of the frequency characteristics of the sound pickup signals corresponding to the spatial acoustic transfer characteristics Hls and Hlo. There is also processing in which the measurement device 200 compresses the level range of the frequency characteristics of the sound pickup signals corresponding to the spatial acoustic transfer characteristics Hro and Hrs. This processing is the same as the processing described in the following. So, the description thereof is omitted as appropriate. Likewise, there is also processing in which the measurement device 300 compresses the level range of the frequency characteristics of the sound pickup signals for the left and right ear canal transfer characteristics. This processing is the same as the processing described in the following. So, the description thereof is omitted as appropriate.

Figure 4:
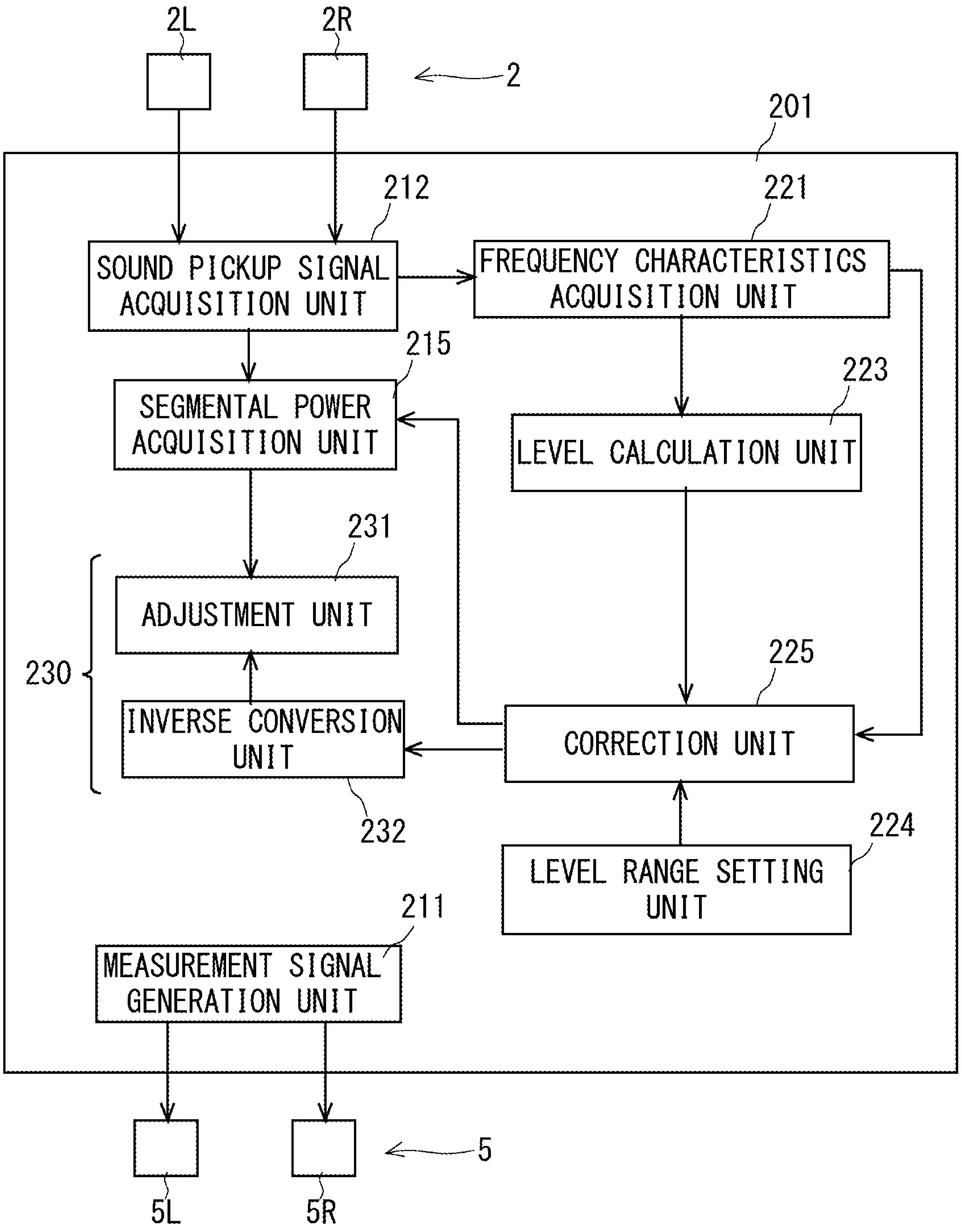
FIG. 4 is a control block diagram showing a configuration of a processing device.

FIG. 4 is a block diagram showing a configuration of the processing device 201 of the measurement device 200. The processing device 201 includes: a measurement signal generation unit 211; a sound pickup signal acquisition unit 212; a segmental power acquisition unit 215; a frequency characteristics acquisition unit 221; a level calculation unit 223; a level range setting unit 224; a correction unit 225; an adjustment unit 231; and an inverse conversion unit 232. The inverse conversion unit 232 and the adjustment unit 231 function as a filter generation unit 230.

The measurement signal generation unit 211 includes a D/A converter, and an amplifier, and generates measurement signals for measuring the spatial acoustic transfer characteristics and the ear canal transfer characteristics. The measurement signals are, for example, impulse signals, or TSP (Time Stretched Pulse) signals. Here, the measurement device 200 performs impulse response measurement, using the impulse sound as the measurement signals. The measurement signal generation unit 211 outputs the measurement signals to the stereo speaker 5. Here describes an example in which a measurement signals are output from the left speaker 5L in order to acquire sound pickup signals corresponding to the spatial acoustic transfer characteristics Hls and Hlo.

The left microphone 2L and the right microphone 2R of the microphone unit 2 each pick up the measurement signals and output the sound pickup signals to the processing device 201. The sound pickup signal acquisition unit 212 acquires the sound pickup signals picked up by the left microphone 2L and the right microphone 2R. Note that the sound pickup signal acquisition unit 212 may include an A/D converter that A/D-converts the sound pickup signals from the microphones 2L and 2R. The sound pickup signal acquisition unit 212 cuts out the sound pickup signals for a predetermined time. In other words, the sound pickup signal acquisition unit 212 extracts a preset number of data (time width) of sound pickup signals. The sound pickup signal acquisition unit 212 may synchronously add the signals obtained by a plurality of measurements. The sound pickup signals acquired by using the left microphone 2L are referred to as sound pickup signals hls, and sound pickup signals acquired by using the right microphone 2R are referred to as sound pickup signals hlo. The sound pickup signals hls and hlo are signals sampled at a sampling frequency of 48 kHz. Further, the sound pickup signals hls and hlo after cutting are filters each having a filter length (number of samples) of 4096. Of course, the sampling frequency and the filter length are not limited to the above values.

The segmental power acquisition unit 215 acquires segmental powers of the sound pickup signals hls and the sound pickup signals hlo. For example, the segmental powers of the sound pickup signals hls and the sound pickup signals hlo are referred to as hlsP and hloP. The segmental power hlsP is the sum of squares of the amplitude values included in the sound pickup signals hls. The segmental power hloP is the sum of squares of the amplitude values included in the sound pickup signals hlo. In the time domain, if the sound pickup signals hls and the sound pickup signals hlo each have a number of data of 4096, the sums of squares of the 4096 amplitude values are the segmental powers hlsP and hloP.

The frequency characteristics acquisition unit 221 acquires frequency characteristics based on the sound pickup signals hls and hlo. The frequency characteristics acquisition unit 221 calculates the frequency characteristics of the sound pickup signals hls and hlo by the discrete Fourier transform or the discrete cosine transform. For example, the frequency characteristics acquisition unit 221 performs FFT (fast Fourier transform) on the sound pickup signals in the time domain, and thereby calculates the frequency characteristics. The frequency characteristics include an amplitude spectrum and a phase spectrum. Note that the frequency characteristics acquisition unit 221 may generate a power spectrum instead of the amplitude spectrum. The frequency-amplitude characteristics of the sound pickup signals hls and hlo are respectively referred to as Fhls and Fhlo. The frequency characteristics Fhls and Fhlo are spectral data of the amplitude spectrum.

The level calculation unit 223 calculates a reference level in the frequency characteristics Fhls and Fhlo. For example, the level calculation unit 223 calculates the average level (average value) of the frequency characteristics Fhls and Fhlo and uses it as the reference level. For example, assuming that the FFT is performed with a filter length (number of samples) T, the level calculation unit 223 calculates level values (dB) of respective frequencies of the frequency-amplitude characteristics to determine the average value. Here, the real (real part) and imag (imaginary part) after performing FFT on the T points are respectively designated by real [i] and imag [i], where: i is an integer from 0 to (T−1). The sound pressure level Amp_dB [i] at each i point is given by the following expression (1).

$$Amp\_dB[i]=\log 10(\mathrm{sqrt}(\mathrm{real}[i]*\mathrm{real}[i]+\mathrm{imag}[i]*\mathrm{imag}[i])) \tag{1}$$

In expression (1), i=1 to (T/2+1), and sqrt is a square root.

Further, assuming that the frequency (Hz) at i point is freq [i] and the sampling frequency is fs, freq [i] is given by the following expression (2):

$$\mathrm{freq}[i]=(T/fs)*i \tag{2}$$

The reference level A in entire frequency band is given by the following expression (3):

[Expression 1]

$$A=\sum_{i=1}^{\frac{T}{2}}\left(\mathrm{Amp\_dB}[i]/\left(\frac{T}{2}\right)\right) \tag{3}$$

Assuming that the reference level of the frequency characteristics Fhls is Ahls and the reference level of the frequency characteristics Fhlo is Ahlo, the reference level A is (Ahls+Ahlo)/2.

Further, the level calculation unit 223 calculates a maximum level maxL and a minimum level minL of the frequency-amplitude characteristics. The maximum level maxL is the maximum value among the amplitude values included in the two spectral data of the frequency characteristics Fhls and Fhlo. The minimum level minL is the minimum value among the amplitude values included in the two spectral data of the frequency characteristics Fhls and Fhlo. The reference level A, the maximum level maxL, and the minimum level minL have common values for the two frequency characteristics Fhls and Fhlo.

The level range setting unit 224 sets a level range X for compression. The level range setting unit 224 inputs the level range X according to, for example, a playback device or the like. To obtain an appropriate out-of-head localization effect, X is preferably 40 dB or more. Further, when the amplifier of the playback device or the like does not have high performance such as audio output efficiency and quality performance, X can be set to 20 dB. X is preferably 20 dB or more and 40 dB or less, but it is not particularly limited to this range.

The correction unit 225 corrects the frequency characteristics Fhls and Fhlo to fall within the predetermined level range X including the reference level A and thereby calculates the corrected characteristics. In other words, the correction unit 225 compresses amplitude levels of the frequency characteristics Fhls and Fhlo so that the amplitude values of the frequency characteristics are included in the level range X. For example, when the level range X is 40 dB, the correction unit 225 compresses the amplitude value to fall within the range of the reference level A±20 dB, and thereby corrects the frequency characteristics Fhls and Fhlo. The characteristic corrected by the correction unit 225 is referred to as corrected characteristics. The corrected characteristics of the frequency characteristics Fhls is designated by NewFhls, and the corrected characteristics of the frequency characteristics Fhlo is designated by NewFhlo.

Here, the amplitude value before correction at a certain frequency is designated by L, and the amplitude value after correction is designated by NewL. In other words, the frequency characteristics Fhls and Fhlo are sets of the amplitude values L before correction, and the corrected characteristics NewFhls and NewFhlo are sets of the amplitude values NewL.

For example, the correction unit 225 can correct the frequency characteristics by using the following expressions (4) and (5).

When L is A or more, $$\mathrm{NewL}=A+(L-X)*(X/2)/(\mathrm{maxL}-A) \quad (4)$$

When L is less than A, $$\mathrm{NewL}=A+(L-X)*(X/2)/(A-\mathrm{minL}) \quad (5)$$

This makes NewL fall within the level range X centered on the reference level. In other words, NewL has an amplitude value of (A−(X/2)) or more and (A+(X/2)) or less. Then, the correction unit 225 calculates the amplitude values after correction, NewL, for all the data (amplitude values L) in the band for correction, by using the above expressions (1) and (2). The set of the amplitude values after correction, NewL, indicates the corrected characteristics. The corrected characteristics can be obtained by correcting the amplitude values of the frequency characteristics Fhls. Further, the correction using (1) and (2) makes it possible to maintain the spectral shapes of the frequency characteristics Fhls and Fhlo before correction, and to compress the range thereof at the same time.

Note that the frequency band to be corrected by the correction unit 225 may be the entire band or a partial band. For example, the band for correction, in which the frequency characteristics Fhls and Fhlo is corrected, can be set to 10 Hz to 20 kHz. In other words, the correction unit 225 does not correct the amplitude values in the band from the lowest frequency (for example, 1 Hz) to less than 10 Hz, and in the band from more than 20 kHz to the highest frequency. Therefore, in the band other than the band for correction, the amplitude values of the frequency characteristics Fhls and Fhlo are used as they are. The band for correction may be changed according to the headphones 43 for out-of-head localization reproduction, that is, the reproduction band of the headphones 43 of FIG. 1.

The filter generation unit 230 generates corrected filters based on the corrected characteristics. Specifically, the filter generation unit 230 includes an inverse conversion unit 232 and an adjustment unit 231. The inverse conversion unit 232 inversely converts the corrected characteristics to generate corrected signals in the time domain. The inverse conversion unit 232 calculates the corrected signals in the time domain from the corrected characteristics and the phase characteristics by the inverse discrete Fourier transform or the inverse discrete cosine transform. The inverse conversion unit 232 generates corrected signals in the time domain by performing an IFFT (inverse fast Fourier transform) on the corrected characteristics and the phase characteristics. The corrected signals obtained from the corrected characteristics NewFhls are referred to as hls2. The corrected signals obtained from the corrected characteristics NewFhlo are referred to as hlo2. The corrected signals hls2 and hlo2 are filters each having the same filter length as that of the sound pickup signals after cutting out.

Note that the phase characteristics can use the phase characteristics calculated by the frequency characteristics acquisition unit 221, as they are. In other words, the inverse conversion unit 232 performs inverse Fourier transform on the phase characteristics corresponding to the frequency characteristic Fhls and the corrected characteristics NewFhls, and thereby generates the corrected signals hls2. The inverse conversion unit 232 performs inverse Fourier transform on the phase characteristics corresponding to the frequency characteristics Fhlo and the corrected characteristics NewFhlo, and thereby generates corrected signals hlo2.

The segmental power acquisition unit 215 acquires the segmental power of the corrected signals hls2 and the corrected signals hlo2. As described above, the segmental power can be the sum of squares of the amplitude values of the signals in the time domain. The segmental power of the corrected signals hls2 is referred to as hls2P, and the segmental power of the corrected signals hlo2 is referred to as hlo2P.

The adjustment unit 231 adjusts the powers of the corrected signals hls2 and hlo2 to maintain the power ratio (energy ratio) between the left and right. The adjustment unit 231 amplifies the corrected signals so that the power ratios before and after the correction are the same. For example, the adjustment unit 231 multiplies the amplitude values of the corrected signals each by a predetermined number. The predetermined number for the corrected signals hls2 is (hlsP/hlsP2), and the predetermined number for the corrected signals hlop2 is (hloP/hloP2).

The corrected signals hls2 and hlo2 after adjusting the power ratios are referred to as the corrected filters hls3 and hlo3. The products of the amplitude values of the corrected signals hls2 and a predetermined number (hlsP/hlsP2) are the amplitude values of the corrected filters hls3. The products of the amplitude values of the corrected signals hlo2 and a predetermined number (hloP/hloP2) are the amplitude values of the corrected filters hlo3. Therefore, the segmental power of the corrected filters hls3 is the same as the segmental power of the sound pickup signals hls. The segmental power of the corrected filters hlo3 is the same as the segmental power of the sound pickup signals hlo.

This makes it possible to generate appropriate corrected filters. In other words, the processing device 201 can generate corrected filters according to the playback device. The corrected filters hls3 and hlo3 are set in the convolution calculation units 11 and 12 shown in FIG. 1 as spatial acoustic filters. As a result, the out-of-head localization processing device 100 can perform reproduction with a high out-of-head localization effect.

Specifically, the corrected characteristics are generated to fall within the level range X according to the playback device. This makes it possible to perform measurement and out-of-head localization processing in a state suitable for a playback device. This makes it possible to generate filters suitable for the out-of-head localization processing.

Further, in the above embodiment, the adjustment unit 231 adjusts the balance between the left and right. This makes it possible to implement an out-of-head localization reproduction well-balanced in the left and right. Of course, the adjustment of the power balance by the adjustment unit 231 can be omitted. For example, when the processing device 201 performs processing on a single set of sound pickup signals hls, the processing of the adjustment unit 231 is omitted. In this case, the corrected signals hls2 are set, as they are, for the corrected filters in the convolution calculation unit 11.

The processing device 201 can also perform processing on sound pickup signals indicating the spatial acoustic transfer characteristics Hro and Hrs in the same manner. In this case, the filter generation unit 230 adjusts the corrected signals so that the segmental power ratio of the sound pickup signals indicating the spatial acoustic transfer characteristics Hro and Hrs is maintained before and after the correction. Further, the processing device 201 can perform processing on the ear canal transfer characteristics of both ears in the same manner. In the processing device 201, the filter generation unit 230 adjusts the corrected signals so that the segmental power ratio between the ear canal transfer characteristics ECTFL of the left ear and the ear canal transfer characteristics ECTFR of the right ear is maintained before and after the correction.

Figure 5:
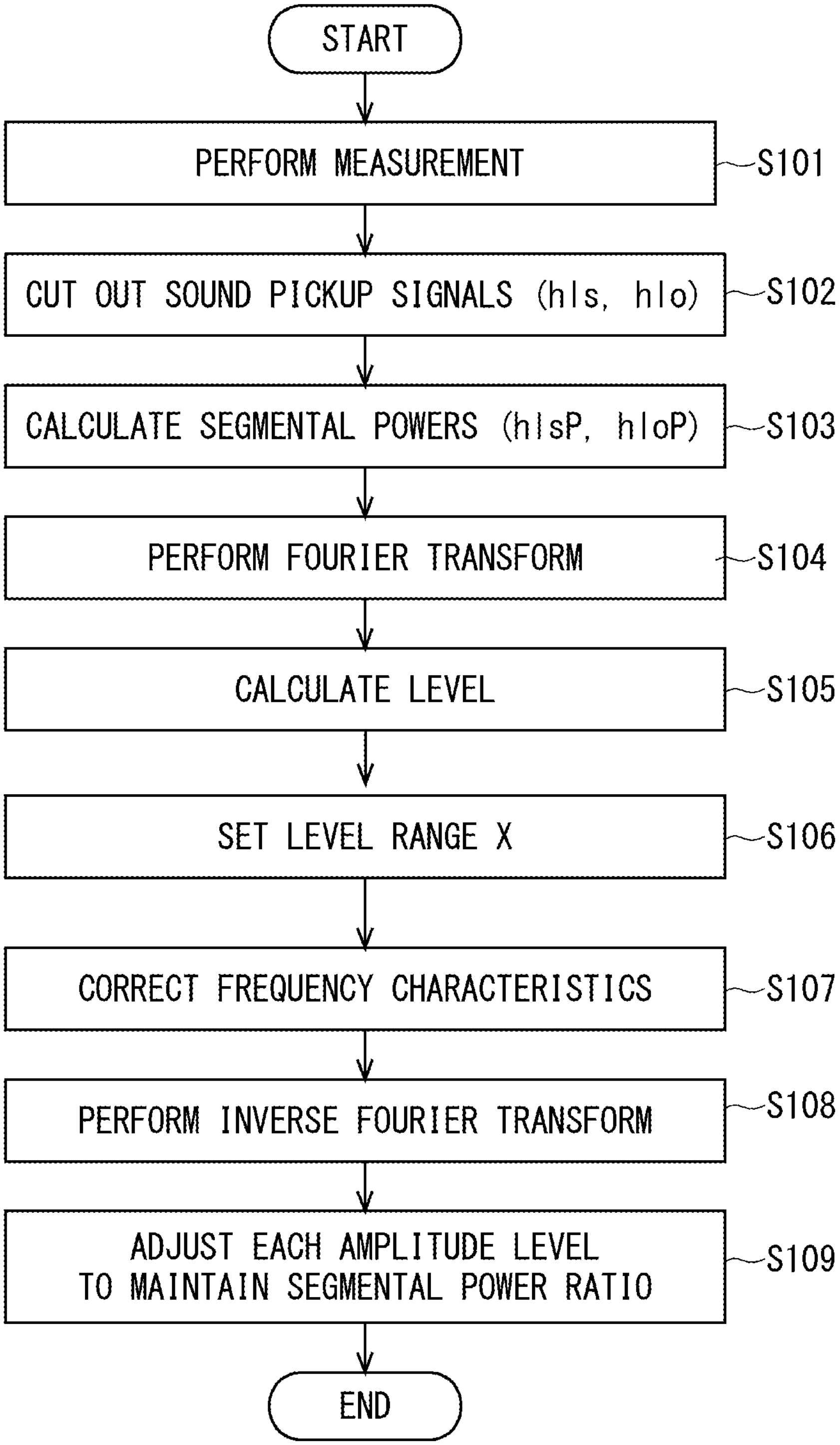
FIG. 5 is a flowchart showing a filter generation method in the processing device.

Next, a filter generation method according to this embodiment will be described with reference to FIG. 5. FIG. 5 is a flowchart showing the filter generation method.

First, the measurement device 200 measures the transfer characteristics using impulse sounds or the like (S101). In other words, the measurement signal generation unit 211 outputs measurement signals such as impulse sounds from the left speaker 5L. The sound pickup signal acquisition unit 212 acquires sound pickup signals from the microphone unit 2 (S102). The sound pickup signal acquisition unit 212 cuts out sound pickup signals from a left microphone 2L and sound pickup signals from a right microphone 2R with a predetermined filter length. As a result, sound pickup signals hls and hlo are obtained.

The segmental power acquisition unit 215 calculates segmental powers of the sound pickup signals hls and hlo (S103). The frequency characteristics acquisition unit 221 performs Fourier transform on the sound pickup signals (S104). As a result, the frequency characteristics Fhls and Fhlo are obtained. The frequency characteristics are frequency-amplitude characteristics (amplitude spectrum), but may be frequency-power characteristics (power spectrum).

The level calculation unit 223 calculates a reference level (S105). As described above, the reference level is the average value of the amplitude values of the two frequency characteristics Fhls and Fhlo. Further, the level calculation unit 223 calculates the maximum level and the minimum level of the frequency characteristics Fhls and Fhlo. The reference level, the maximum level, and the minimum level may be calculated from the amplitude values of the entire band, or may be calculated from the amplitude values of a partial band.

Further, the level range setting unit 224 sets a level range for compression (S106). The level range is set according to the models and performance of the playback device. For example, a user or a staff for filter generation may input a level range X. Then, the correction unit 225 compresses and corrects frequency characteristics Fhls and Fhlo so that the amplitude values of the frequency characteristics Fhls and Fhlo fall within the level range X including the reference level (S107). As a result, corrected characteristics NewFhls and NewFhlo are obtained. The amplitude values of the corrected characteristics NewFhls and NewFhlo are included in the level range X.

Next, the inverse conversion unit 232 performs inverse Fourier transform on the corrected characteristics (S108). In the inverse Fourier transform, the frequency-amplitude characteristics are corrected characteristics, and the frequency-phase characteristics are the frequency-phase characteristics calculated by the Fourier transform of S104. As a result, the corrected signals hls2 and the corrected signals hlo2 in the time domain are obtained.

The adjustment unit 231 adjusts the amplitude levels of the corrected signals hls2 and the corrected signals hlo2, to maintain the segmental power ratio of the sound pickup signals hls and hlo (S109). Specifically, the adjustment unit 231 multiplies the corrected signals hls2 and the corrected signals hlo2 each by a predetermined number according to the segmental power ratio. As a result, the corrected filters hls3 and the corrected filters hlo3 are obtained. The adjustment unit 231, which adjusts the power ratio, can generate filters having a good balance between the left and right.

(Processing Example 1 of Correction)

Figure 6:
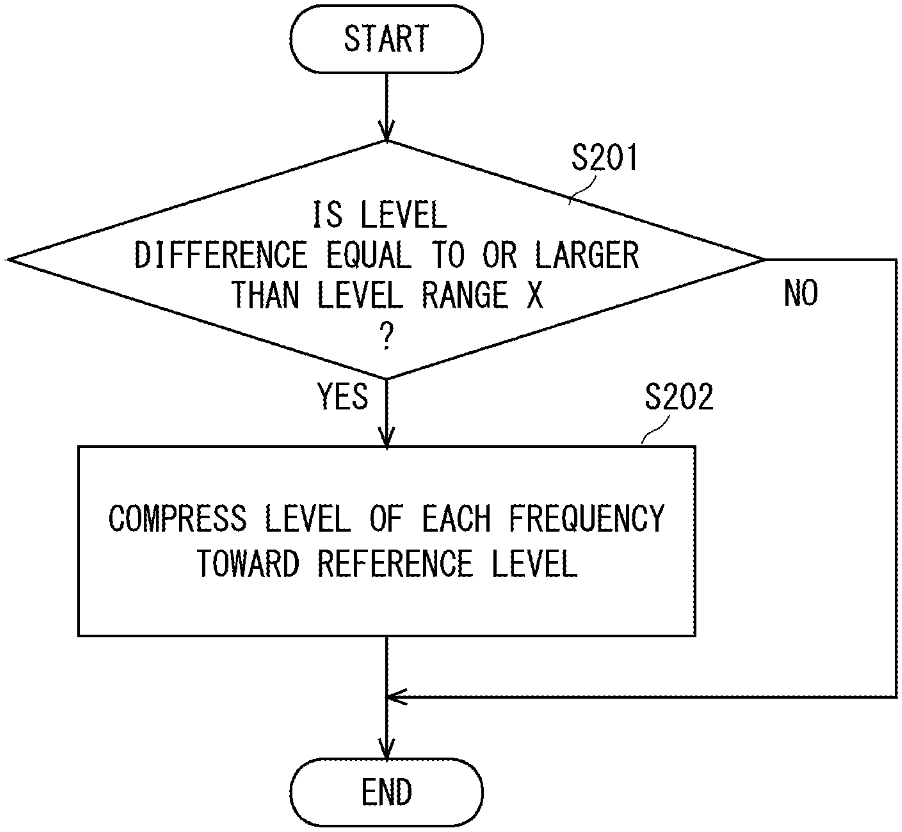
FIG. 6 is a flowchart showing a processing example 1 of correction processing.

Next, an example of the correction step of step S107 will be described with reference to FIG. 6. FIG. 6 is a flowchart showing a processing example 1 of correction processing by the correction unit 225.

First, the correction unit 225 determines whether the level difference of the frequency-amplitude characteristics is equal to or higher than the level range X (S201). The level difference is a level difference (maxL-minL) between the maximum value (maximum level maxL) and the minimum value (minimum level minL). The maximum level and the minimum level may be the maximum value and the minimum value of the frequency-amplitude characteristics in the entire band, or may be the maximum value and the minimum value in a partial band.

When the level difference is equal to or smaller than the level range X (NO in S201), the correction unit 225 does not perform correction and ends the processing. When the difference is larger than the level range X (YES in S201), the correction unit 225 compresses the level (amplitude value) of each frequency toward the reference level (S202). As a result, the frequency characteristics are corrected so that the level at each frequency falls within the level range X.

Figure 7:
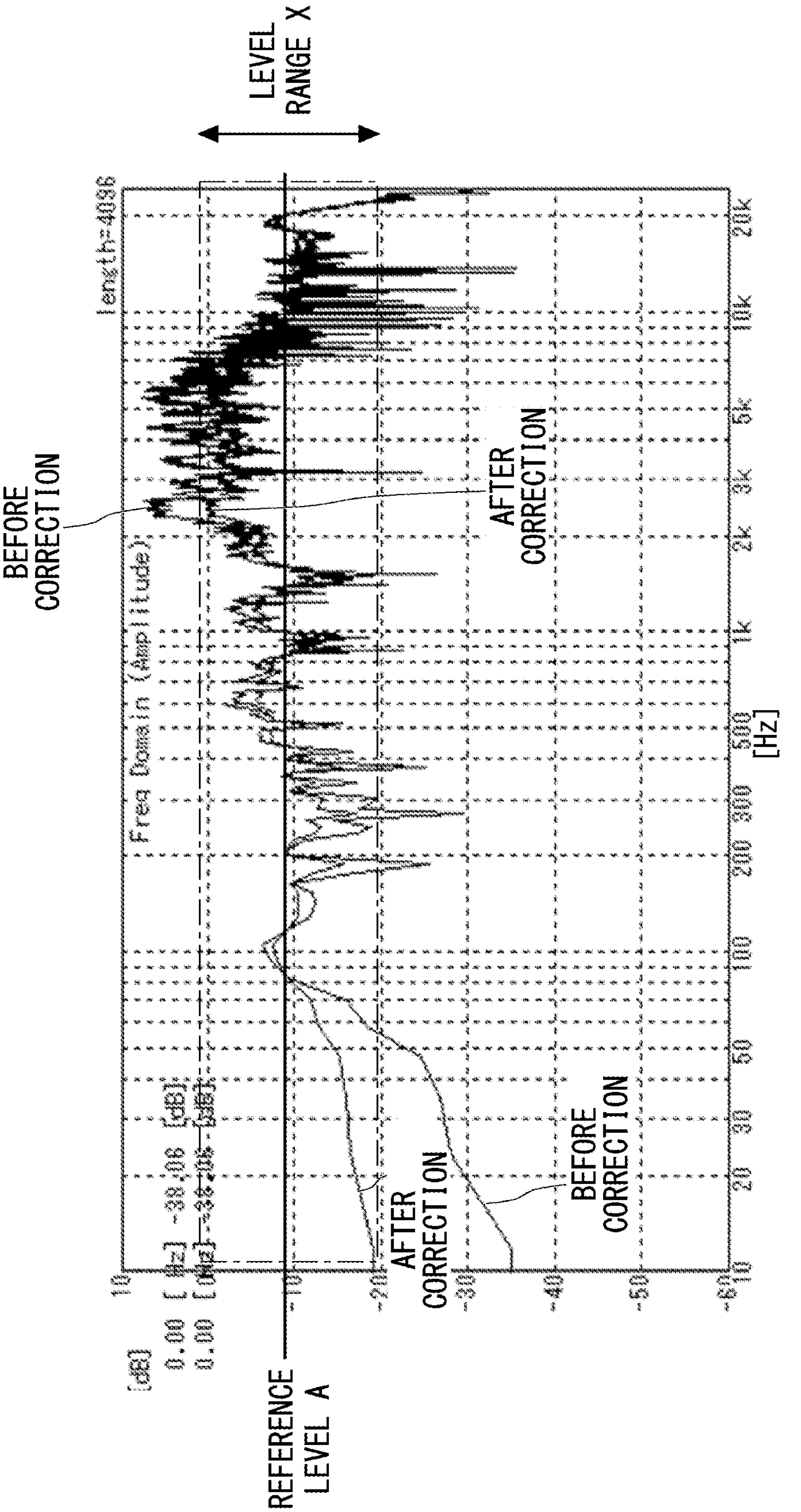
FIG. 7 is a graph showing frequency-amplitude characteristics before and after correction according to the processing example 1.

FIG. 7 is a graph showing the frequency-amplitude characteristics before and after the correction of the processing example 1. In other words, FIG. 7 shows the amplitude spectrum of the frequency characteristics Fhls before correction and the corrected characteristics NewFhls. As shown in FIG. 7, the frequency-amplitude characteristics after correction fall within the level range X centered on the reference level A. In FIG. 7, the reference level A is expressed as A=−9.4 dB, and the level range X is expressed as X=20 dB. Further, in FIG. 7, the band for correction is set to 10 Hz to 20 KHz.

(Processing Example 2 of Correction)

Figure 8:
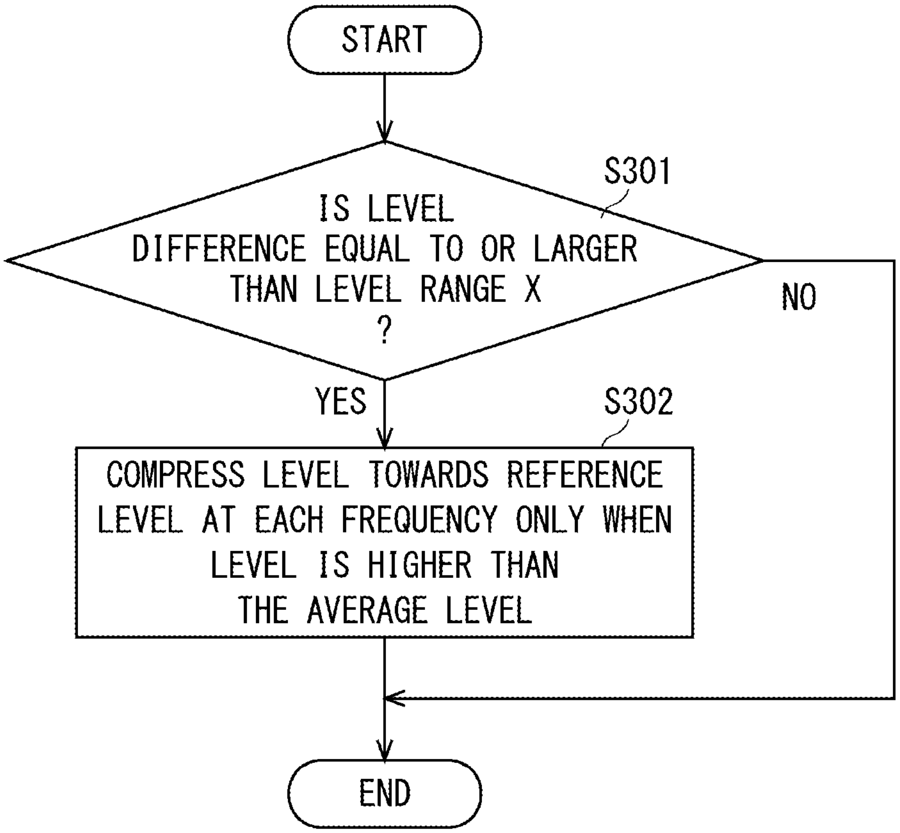
FIG. 8 is a flowchart showing a processing example 2 of correction processing.

Next, another example of the correction step of step S107 will be described with reference to FIG. 8. FIG. 8 is a flowchart showing a processing example 2 of correction processing by the correction unit 225. In the processing example 2, the correction unit 225 corrects only levels (amplitude values) larger than the reference level.

First, the correction unit 225 determines whether the level difference of the frequency-amplitude characteristics is equal to or higher than the level range X (S301). The level difference is a difference value (maxL-minL) between the maximum value (maximum level maxL) and the minimum value (minimum level minL). The maximum level and the minimum level may be the maximum value and the minimum value of the frequency-amplitude characteristics in the entire band, or may be the maximum value and the minimum value in a partial band.

When the level difference is smaller than the level range X (NO in S301), the correction unit 225 does not perform correction and ends the processing. When the difference is larger than the level range X (YES in S301), the correction unit 225 compresses only the level (amplitude value), which is larger level than the reference level, toward the reference level (S302) at each frequency. The correction unit 225 lowers the level higher than the reference level.

Note that, in the processing example 2, the correction unit 225 does not correct levels equal to or lower than the reference level. Therefore, at frequencies with levels equal to or lower than the reference level, the amplitude values are the same before and after the correction.

Further, in the processing example 2, the correction unit 225 corrects only the levels higher than the reference level, but may correct only the levels lower than the reference level. In other words, in the processing example 2, the correction unit 225 only corrects either the levels higher than the reference level or the levels lower than the reference level. The correction unit 225 is just required to correct the frequency characteristics only either at a level equal to or higher than the reference level or at a level equal to or lower than the reference level.

Figure 9:
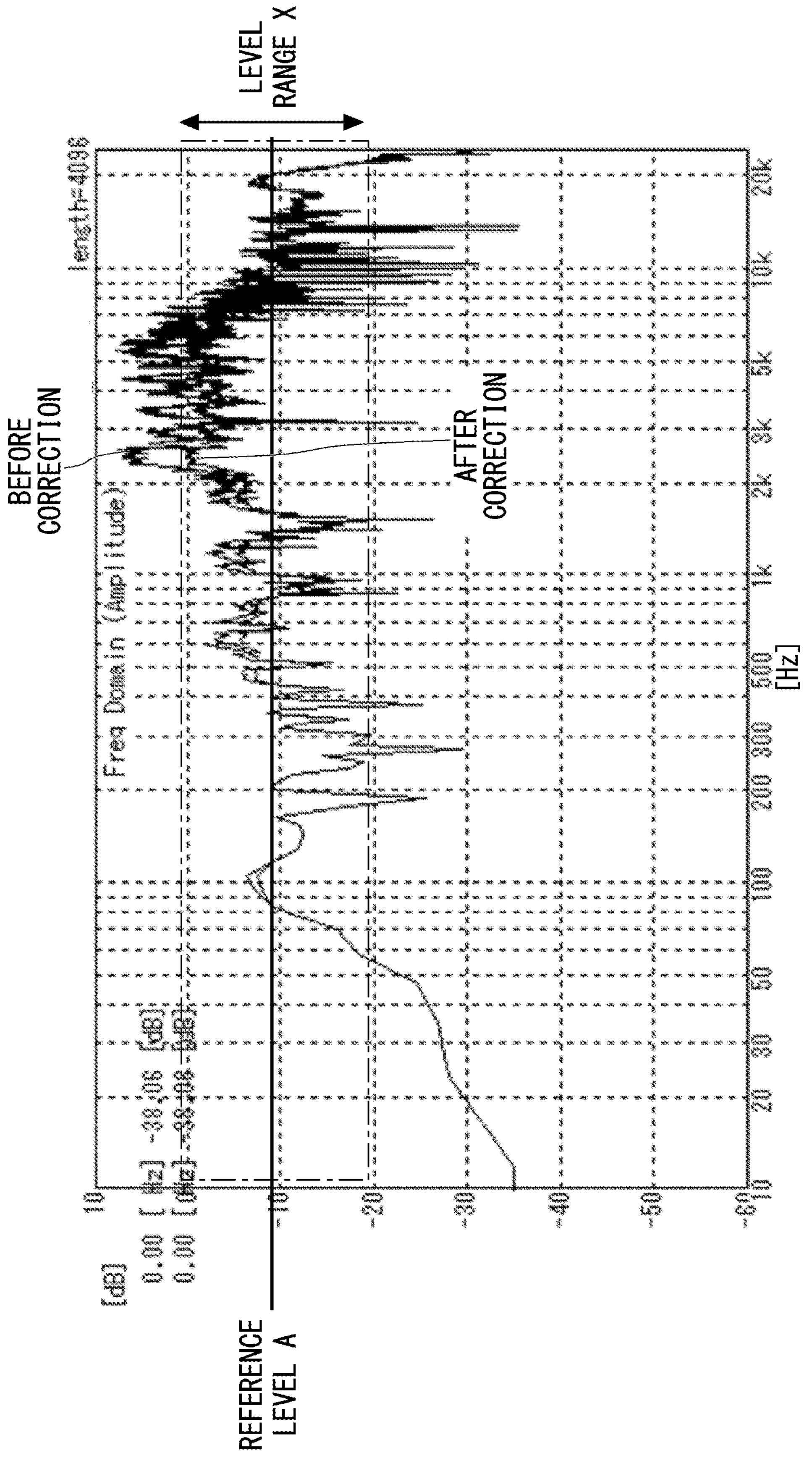
FIG. 9 is a graph showing frequency-amplitude characteristics before and after correction according to the processing example 2.

FIG. 9 is a graph showing the frequency-amplitude characteristics before and after the correction of the processing example 2. In FIG. 9, the reference level A is expressed as A=−9.4 dB and the level range is expressed as X=20 dB. Further, in FIG. 9, the band for correction is set to 10 Hz to 20 kHz. As shown in FIG. 9, the amplitude values, which have been higher than the reference level A, have frequency-amplitude characteristics falling within the level range X after correction. In this case, the level lower than the reference level A may not fall within the level range X. In other words, in the processing example 2, the frequency-amplitude characteristics fall within the level range from min level to (A+(X/2)).

(Processing Example 3 of Correction)

In processing example 3, the frequency axis of the frequency-amplitude characteristics is a log scale. The following describes the reason for converting the frequency axis to a log scale. In general, it is said that the amount of sensitivity of a human is converted to logarithmic values. Therefore, it is important to consider the frequency of the audible sound on the logarithmic axis. The scale conversion causes the data to be equally spaced in the amount of sensitivity, and enables the data to be used equivalently in all frequency bands. This facilitates mathematical calculation, frequency band division and weighting, enabling them to obtain stable results. Note that the frequency characteristics acquisition unit 221 is only required to convert the frequency characteristics to, without being limited to the log scale, a scale approximate to the auditory sense of a human (referred to as an auditory scale). The axis conversion is performed using an auditory scale such as a log scale, a mel scale, a Bark scale, an ERB (Equivalent Rectangular Bandwidth) scale.

The frequency characteristics acquisition unit 221 performs scale conversion on the spectral data with an auditory scale by data interpolation. For example, the frequency characteristics acquisition unit 221 interpolates the data in the low-frequency band, in which the data are sparsely spaced in the auditory scale, to densify the data in the low-frequency band. The data equally spaced on the auditory scale are densely spaced in the low-frequency band and sparsely spaced in the high-frequency band on the linear scale. This enables the frequency characteristics acquisition unit 221 to generate axis conversion data equally spaced on the auditory scale. Of course, the axis conversion data does not need to be completely equally spaced data on the auditory scale. This causes the correction unit 225 and the like to perform processing on the frequency-amplitude characteristics of the log scale. Further, to make the number of samples the same as those of the frequency-phase characteristics, the frequency axis may be returned to the linear scale before the inverse conversion.

(Processing Example 4 of Correction)

Figure 10:
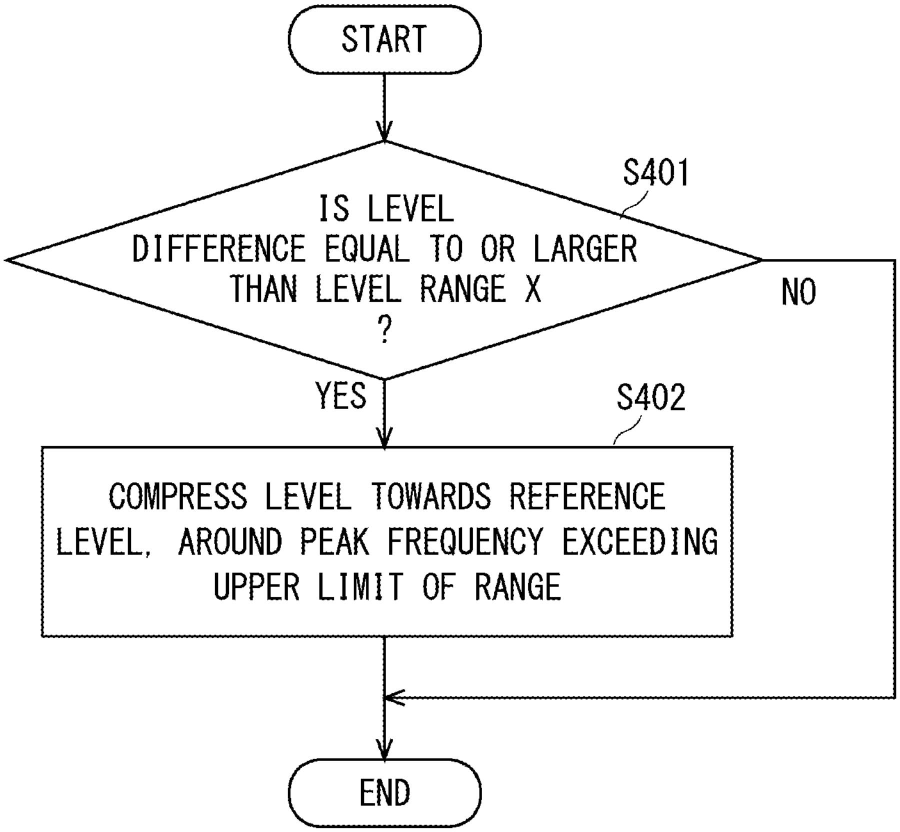
FIG. 10 is a flowchart showing a processing example 4 of correction processing.

In processing example 4, the correction unit 225 does not correct the entire band for correction, but corrects the amplitude values only at the frequency around a peak that exceeds the upper limit value of the level range X. The processing example 4 will be described with reference to FIG. 10. FIG. 10 is a flowchart showing a processing example 4.

First, the correction unit 225 determines whether the level difference of the frequency-amplitude characteristics is equal to or higher than the level range X (S401). The level difference is a difference value (maxL-minL) between the maximum value (maximum level maxL) and the minimum value (minimum level minL). The maximum level and the minimum level may be the maximum value and the minimum value of the frequency-amplitude characteristics in the entire band, or may be the maximum value and the minimum value thereof in a partial band.

When the level difference is smaller than the level range X (NO in S401), the correction unit 225 does not perform correction and ends the processing. When the difference is larger than the level range X (YES in S401), the correction unit 225 compresses the amplitude values toward the reference level around the peak frequency, at which the peak exceeds the upper limit value (A+X/2) of the range (S402).

For example, the correction unit 225 obtains intersection frequencies at which the curve of the frequency characteristic intersects the upper limit value before and after the peak frequency. The correction unit 225 calculates a first intersection frequency lower than the peak frequency and a second intersection frequency higher than the peak frequency. The correction unit 225 compresses the amplitude values toward the reference level in the frequency band defined by the first intersection frequency and the second intersection frequency.

Specifically, the correction unit 225 obtains the first intersection frequency at which the curve of the frequency characteristic intersects the upper limit value of the range on the lower frequency side than the peak frequency. The correction unit 225 obtains the second intersection frequency at which the curve of the frequency characteristic intersects with the upper limit value of the range on the higher frequency side than the peak frequency. The correction unit 225 corrects the amplitude values in the frequency band from the first intersection frequency to the second intersection frequency. This makes it possible to correct the amplitude values exceeding the upper limit value of the range, around the peak.

Figure 11:
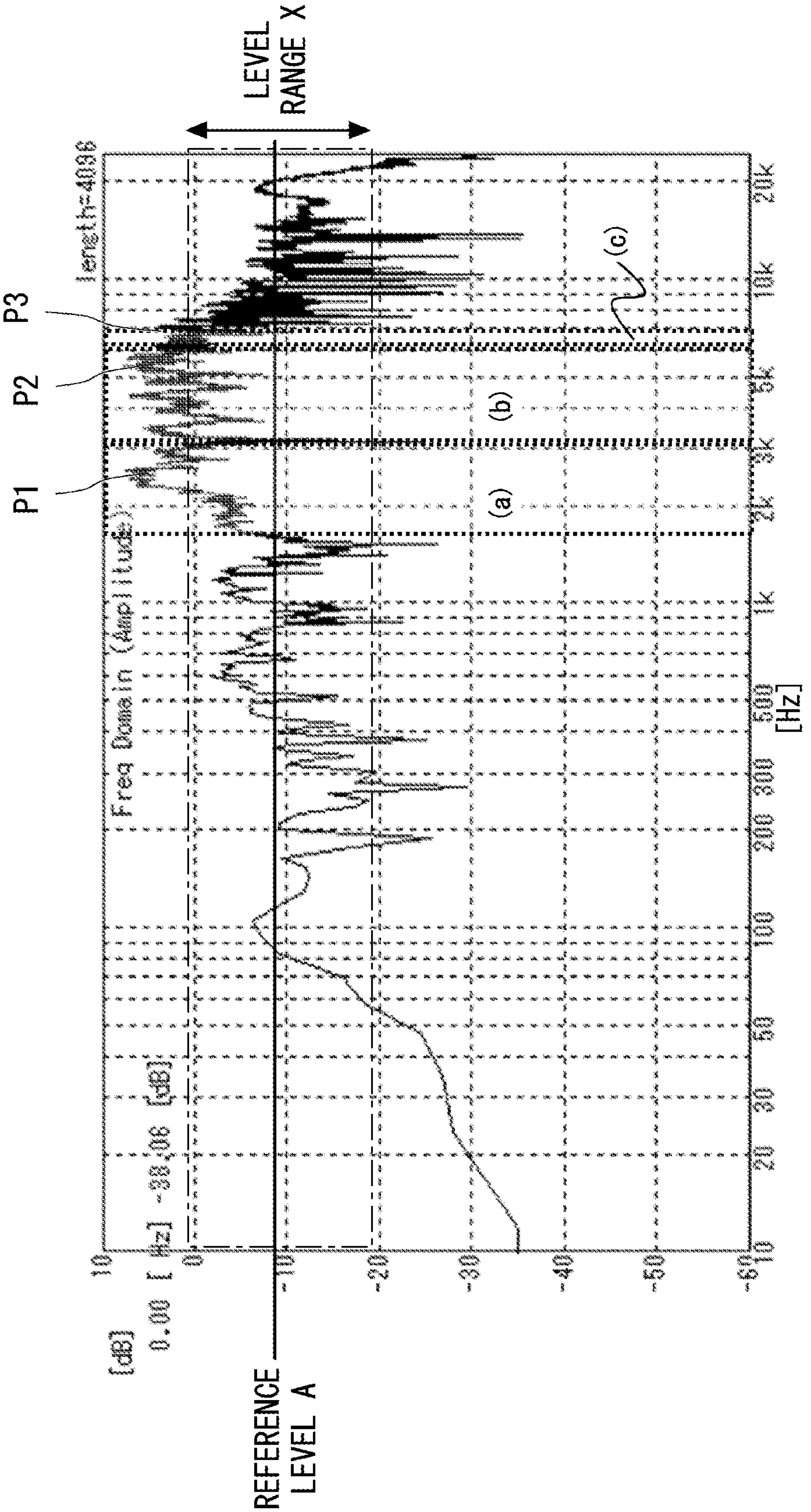
FIG. 11 is a graph showing a frequency band according to the processing example 4.

FIG. 11 is a graph showing three frequency bands (a) to (c) defined by the intersection frequencies. The frequency band (a) is a frequency band including a first peak P1. In other words, the frequency band (a) is defined by the intersection frequencies before and after the first peak P1. The frequency band (b) is a frequency band including a second peak P2. The frequency band (c) is a frequency band including a third peak P3. Further, as shown in FIG. 11, one frequency band may include a plurality of peaks close to each other.

As described above, in the processing example 4, only the amplitude values exceeding only the upper limit value of the range is compressed toward the reference level. Further, the correction unit 225 may correct the amplitude values below the lower limit value (A−(X/2)) of the level range X, at a frequency around a dip. Also in this case, the correction unit 225 obtains intersection frequencies at which the curve of the frequency characteristic intersects the lower limit value before and after the dip, which is below the lower limit value. The correction unit 225 may compress the amplitude values in the frequency band defined by the two intersection frequencies. Of course, the correction unit 225 may compress the amplitude values in both the frequency band including the peak and the frequency band including the dip. Alternatively, the correction unit 225 may compress the amplitude values only in the frequency band including the peak, or may compress the amplitude values only in the frequency band including the dip.

(Processing Example 5 of Correction)

In processing example 5, the correction unit 225 performs correction using a different method. Specifically, the levels of the amplitude values are corrected by using smoothing processing such as moving average. The frequency characteristics (spectral data) are smoothed using methods such as moving average, Savitzky-Golay filter, smoothing spline, cepstrum transform, or cepstrum envelope. The correction unit 225 performs smoothing processing on the frequency characteristics, and thereby corrects the frequency characteristics so that the frequency characteristics fall within the level range X.

(Processing Example 6 of Correction)

In processing example 6, the sound pickup signals regarding the ear canal transfer characteristics are processed. In other words, the measurement device 300 shown in FIG. 3 performs measurement. Specifically, in the processing device 201 shown in FIG. 4, the measurement signal generation unit 211 outputs the measurement signals to the headphones 43 instead of the speaker 5L. In this case, the left and right microphones 2L and 2R pick up the sound pickup signals indicating the ear canal transfer characteristics of the left and right ears. The frequency-amplitude characteristics are acquired. The reference levels, maximum levels, and minimum levels are acquired from the two frequency-amplitude characteristics. The processing other than the above points is the same as that of the above-described embodiments and processing examples, so the description thereof will be omitted.

(Processing Example 7 of Correction)

In processing example 7, a multi-channel speaker such as 5.1ch or 7.1ch is used. Then, the adjustment unit 231 performs adjustment so that the power ratio of the sound pickup signals is maintained for each channel.

The 5.1ch multi-channel uses left and right front speakers, left and right rear speakers, a center speaker, and a sub-woofer. In this case, the adjustment unit 231 adjusts the corrected signals to maintain the power ratio between the front speaker and the rear speaker. Specifically, the adjustment unit 231 multiplies each corrected signal by a coefficient that makes the segmental power ratio the same before and after the correction.

Specifically, the measurement device 200 performs measurements using speakers of different channels in order. For example, the measurement signal generation unit 211 generates measurement signals and sequentially outputs them to the speakers of the respective channels. The sound pickup signal acquisition unit 212 sequentially picks up the measurement signals from the speakers of the respective channels, and thereby acquires the acquisition signals. The frequency characteristics acquisition unit 221 acquires a plurality of frequency characteristics based on the measurement signals obtained by picking up the measurement signals output from the speakers of different channels.

The segmental power acquisition unit 215 calculates the left and right segmental powers of the sound pickup signals of the respective channels. The adjustment unit 231 adjusts the levels of the corrected signals to maintain the power ratio. This makes it possible to generate filters well-balanced between channels. Note that the level range X may be different for each channel or may be the same among channels.

Note that the processing of maintaining the power ratio among channels is not limited to multi-channels such as 5.1ch, but can also be applied to 2ch measurement devices shown in FIG. 2. For example, measurement may be made with the left and right speakers, and adjustment may be performed to maintain the power ratio.

The above processing examples 1 to 7 can be combined as appropriate. For example, when the correction unit 225 corrects the amplitude values around the peak frequency or the dip frequency as in the processing example 4, the correction unit 225 may use the axis conversion processing on the frequency axis in the processing example 3, or the smoothing processing in the processing example 5.

As described above, according to this embodiment, the frequency characteristics are corrected to fall within the predetermined level range X including the reference level. This makes it possible to reproduce filters capable of obtaining an appropriate out-of-head localization effect even in various playback devices, equipment, and measurement environments. In other words, this makes it possible to automatically correct filters so that the signal that has been subjected to out-of-head localization processing is not clipped. This also makes it possible to perform out-of-head localization listening according to the speaker, headphones, and measurement environment, which meet preference of the user. Further, this allows automatic correction according to the playback device.

Second Embodiment

Figure 12:
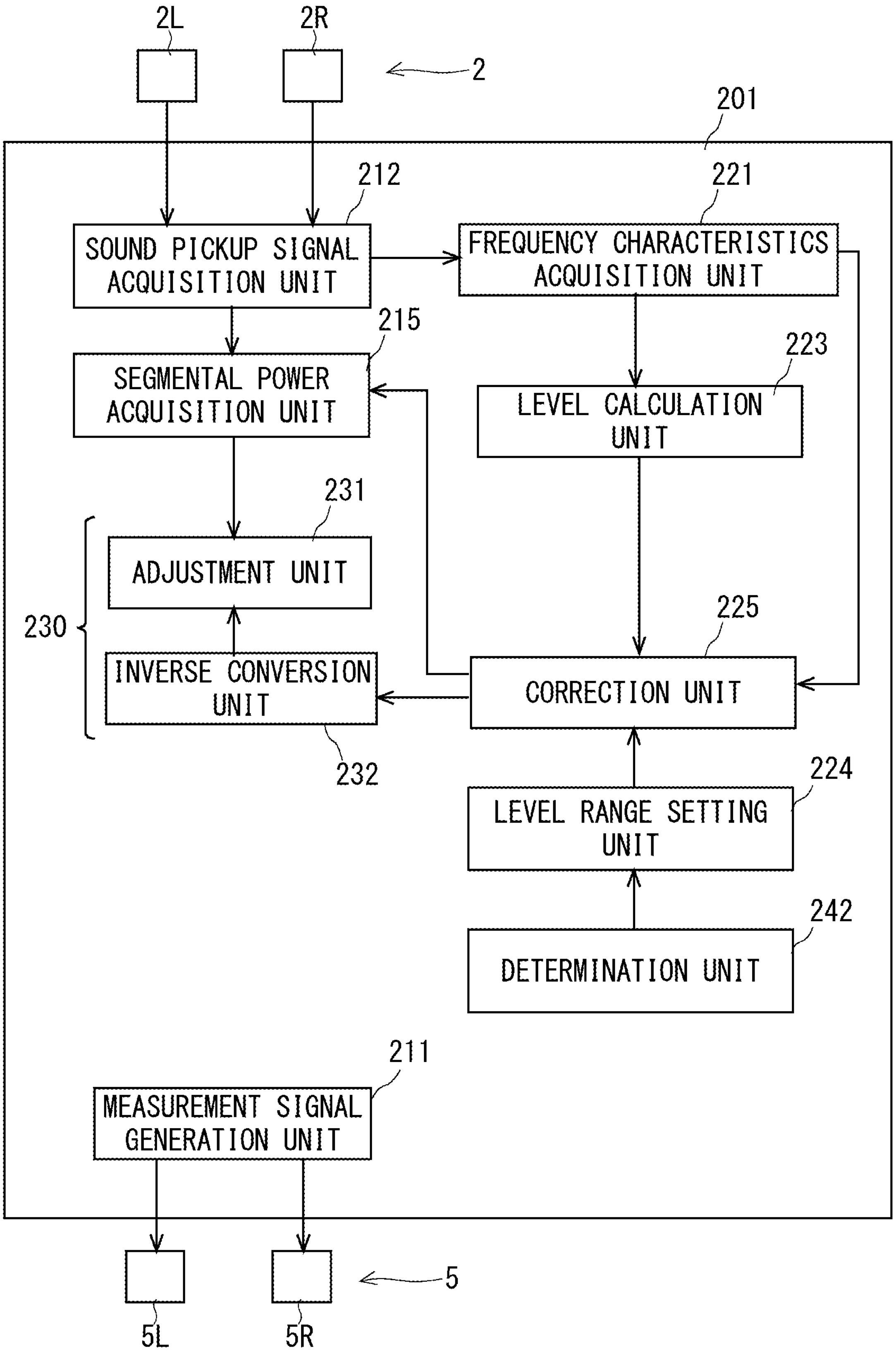
FIG. 12 is a block diagram showing a configuration of a processing device according to a second embodiment.

A device and a method according to a second embodiment will be described with reference to FIG. 12. FIG. 12 is a block diagram showing a configuration of a processing device 201. In the second embodiment, processing of setting a level range X is one of the technical features. As a result, the processing device 201 shown in FIG. 12 has a determination unit 242 added to the configuration of FIG. 4. The configuration and processing other than the determination unit 242 are the same as those in the first embodiment, so the description thereof will be omitted as appropriate.

The determination unit 242 determines performance of a playback device. For example, the determination unit 242 evaluates performance of an amplifier of the playback device. The level range setting unit 224 sets the level range X according to the determination result in the determination unit 242. The correction unit 225 corrects frequency characteristics based on the level range X, and thereby calculates the corrected characteristics. The filter generation unit 230 generates corrected filters based on the corrected characteristics.

For example, the determination unit 242 can make a determination based on the frequency characteristics acquired by the frequency characteristics acquisition unit 221. The determination unit 242 detects a level difference (maxL-minL) between the maximum level (maxL) and the minimum level (minL) of the frequency-amplitude characteristics. The determination unit 242 acquires the output level (output sound pressure level) and S/N ratio of the playback device based on the level difference. Then, the determination unit 242 determines the performance based on the output level or the S/N ratio. The determination unit 242 may determine the level range X according to the level difference between the maximum level and the minimum level of the frequency-amplitude characteristics.

For example, in the case of a playback device having a large level difference, the level range X is made about 80% of the level difference. The determination unit 242 sets a variable to 0.8. In the case of a playback device having a small level difference, the level range X is set to about 40% of the level difference. The level range setting unit 224 multiplies the level difference by the variable corresponding to the determination result, to set the level range X.

Further, the processing device 201 can set the level range X without using the variable. For example, the determination unit 242 calculates the level difference (maxL-minL) in a part of a band for determination. The band for determination may be a band having a predetermined range. The band for determination may be, for example, 100 Hz to 8 kHz. In other words, the determination unit 242 obtains the maximum level (maxL) and the minimum level (minL) in 100 Hz to 8 kHz. Then, the determination unit 242 makes a determination based on the level difference (maxL-minL). Alternatively, the determination unit 242 may have a conversion expression or a conversion table for converting the level difference into the level range X.

In this way, the determination unit 242 makes a determination based on the frequency characteristics of the sound pickup signals obtained by the measurement using the playback device. The determination unit 242 makes a determination based on the level difference between the maximum level and the minimum level of the frequency characteristics.

Further, the determination unit 242 may acquire playback device information regarding the playback device and may determine the performance based on the playback device information. Then, the level range setting unit 224 sets the level range X according to the performance of the playback device. For example, when the amplifier of the playback device has high performance, the level range setting unit 224 sets X to 40 dB. When the amplifier has low performance, the level range setting unit 224 sets X to 20 dB. Of course, the determination by the determination unit 242 is not limited to the two stages of high performance and low performance, and may be three or more stages.

Further, the determination unit 242 may have a table showing the performance for each model number of the playback device. The determination unit 242 acquires the playback device information indicating the model number of the playback device. The determination unit 242 determines the performance according to the model number of the playback device. The playback device information regarding the playback device may be automatically acquired or input by the user, for example. For example, in the case of a Bluetooth-connected playback device, the determination unit 242 can automatically acquire the information regarding the playback device.

For example, the measurement device 200 or the measurement device 300 performs measurements for acquiring frequency characteristics in advance for the respective playback device. Then, as described above, the determination unit 242 determines the performance according to the level difference of the frequency characteristics, and stores the determination result in the table. Then, the determination unit 242 can make a determination by referring to the table.

Note that the playback device may be the speakers 5L and 5R shown in FIG. 2, the amplifier thereof, or the headphones 43 shown in FIG. 3. In other words, the playback device may be a playback device to be used at the time of measurement. Alternatively, the playback device may be the headphones 43 in the out-of-head localization processing device shown in FIG. 1. In other words, the playback device may be headphones 43 or earphones to be used during out-of-head localization listening. Also in the second embodiment, any one or more of the above processing examples 1 to 7 can be used.

As described above, this embodiment makes it possible to automatically set the level range X according to the performance of the playback device. Then, the correction unit 225 performs correction based on the level range X. This makes it possible to reproduce filters capable of obtaining an appropriate out-of-head localization effect even in various playback devices, equipment, and measurement environments. In other words, this makes it possible to automatically correct filters so that the signal that has been subjected to out-of-head localization processing is not clipped. This makes it possible to perform out-of-head localization listening according to the speaker, headphones, and measurement environment, which meet preference of the user. Further, this allows automatic correction according to the playback device.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A filter generation device, comprising:

a processor coupled to a memory storing instructions to make the processor to function as:

a frequency characteristics acquisition unit configured to acquire frequency characteristics based on sound pickup signals;

a level calculation unit configured to calculate a reference level in the frequency characteristics;

a correction unit configured to correct the frequency characteristics so that the frequency characteristics fall within a predetermined level range including the reference level, and thereby calculate corrected characteristics; and a filter generation unit configured to generate a corrected filter based on the corrected characteristics, wherein the frequency characteristics acquisition unit:

acquires first frequency characteristics based on first sound pickup signals picked up by a left microphone worn on a left ear of a user; and acquires second frequency characteristics based on second sound pickup signals picked up by a right microphone worn on a right ear of the user, wherein the level calculation unit calculates a common level for the first frequency characteristics and the second frequency characteristics, wherein the correction unit calculates first corrected characteristics obtained by correcting the first frequency characteristics, and second corrected characteristics obtained by correcting the second frequency characteristic, and wherein the filter generation unit:

performs inverse Fourier transform on each of the first corrected characteristics and the second corrected characteristics, and thereby generates first corrected signals and second corrected signals in a time domain; and adjusts levels of the first corrected signals and the second corrected signals to maintain a power ratio between left and right, before and after the correction.

2. The filter generation device according to claim 1, wherein the frequency characteristics acquisition unit acquires a plurality of frequency characteristics based on sound pickup signals obtained by sequentially picking up measurement signals output from speakers of different channels, and wherein levels of corrected signals are adjusted so that a power ratio between the sound pickup signals of the channels is maintained.

3. The filter generation device according to claim 1, wherein:

the correction unit corrects the frequency characteristics only either at a level equal to or higher than the reference level or at a level equal to or lower than the reference level.

4. A filter generation device, comprising:

a processor coupled to a memory storing instructions to make the processor to function as:

a frequency characteristics acquisition unit configured to acquire frequency characteristics based on sound pickup signals;

a level calculation unit configured to calculate a reference level in the frequency characteristics;

a correction unit configured to correct the frequency characteristics so that the frequency characteristics fall within a predetermined level range including the reference level, and thereby calculate corrected characteristics;

a filter generation unit configured to generate a corrected filter based on the corrected characteristics;

a determination unit configured to determine performance of a playback device; and a level range setting unit configured to set a level range according to a determination result of the determination unit, wherein the correction unit corrects the frequency characteristics based on the level range, and thereby calculates corrected characteristics.

5. The filter generation device according to claim 4, wherein the determination unit makes a determination based on the frequency characteristics of the sound pickup signals obtained by measurement using the playback device.

6. The filter generation device according to claim 5, wherein the determination unit makes a determination based on a level difference between a maximum level and a minimum level of the frequency characteristics.

7. The filter generation device according to claim 4, wherein the determination unit acquires playback device information regarding the playback device and makes a determination based on the playback device information.

8. A filter generation method, comprising:

acquiring frequency characteristics based on sound pickup signals;

calculating a reference level in the frequency characteristics;

correcting the frequency characteristics so that the frequency characteristics fall within a predetermined level range including the reference level, and thereby calculating corrected characteristics;

generating a filter based on the corrected characteristics;

determining performance of a playback device; and setting a level range according to a result of the determination using a determination unit, wherein the correcting of the frequency characteristics corrects the frequency characteristics based on the level range, and thereby calculates corrected characteristics.

* * * * *